J. F. BYLAND.
CORN HARVESTER.
No. 97,599. Patented Dec. 7, 1869.
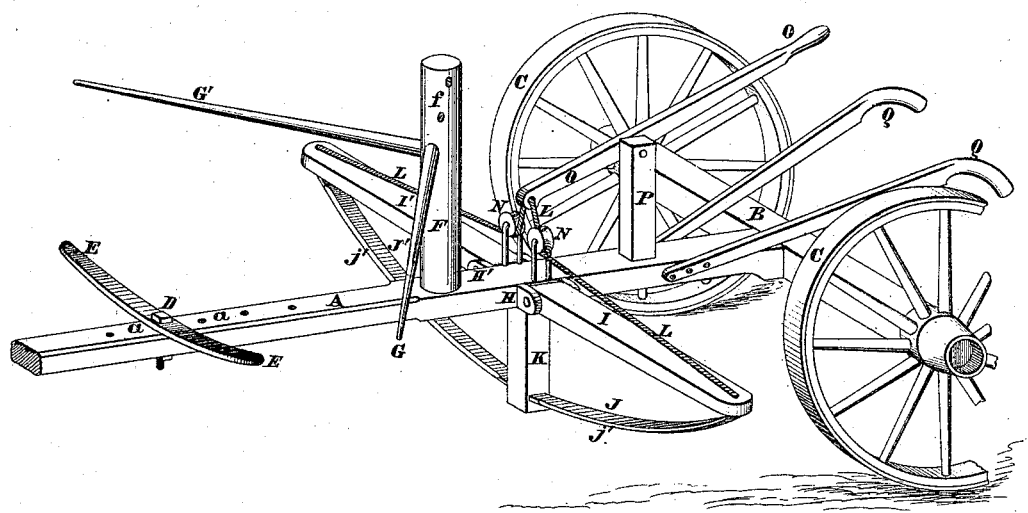
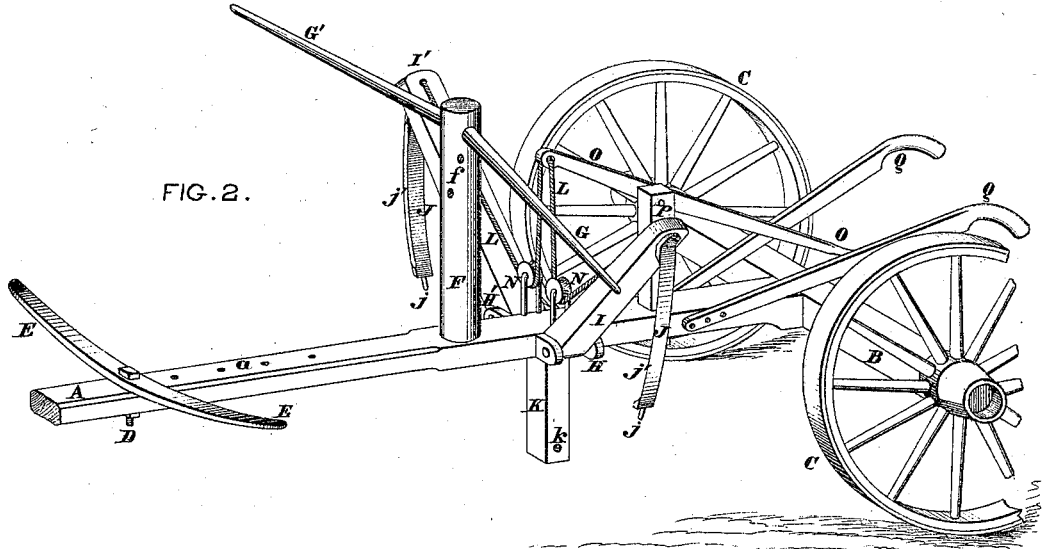
FIG. 2.
ATTEST.
Jas. H. Layman
Sam'l Knight
Knight Bros., Attorneys of
John F. Byland.

United States Patent Office.

JOHN F. BYLAND, OF WALTON, KENTUCKY.

Letters Patent No. 97,599, dated December 7, 1869.

IMPROVED CORN-HARVESTER.

The Schedule referred to in these Letters Patent and making part of the same.

I, JOHN F. BYLAND, of Walton, in the county of Boone, and State of Kentucky, have invented a certain Improved Corn-Harvester, of which the following is a specification.

Nature and Objects of the Invention.

My invention relates to a corn-harvester that is drawn by a single horse or a single file of horses walking between two rows of corn, which latter are cut down simultaneously, and left in piles ready to be carried for shocking.

The first part of my invention consists in the provision of arms or bars, which are hinged to the beam, and to whose free ends are secured the cutting-knives which form a rest for the corn while the pile or bundle is accumulating, and whose ends are supported in the act of cutting by entering cavities in a pendant from said beam.

The second part of my invention consists in combining with the devices above named a rest for the top ends of the stalks, and inclined arms on a suitably arranged standard, by which to gather in the stalks and force them forward upon said rest.

General Description with Reference to the Drawings.

Figure 1 is a perspective view of my corn-harvester, with the knives in the cutting-position, the implement being represented in condition for cutting short corn.

Figure 2 is a similar view, with the knives in the dumping-position, and the machine arranged so as to cut tall corn.

A is the beam;

B, the axle, into which the beam is mortised at right angles; and

C is the wheels.

A pair of customary shafts or thills (not shown in the drawing) are rigidly attached to a cross-bar at the forward end of the beam, and to the said shafts the horse is secured by customary harness.

Near the forward end of the beam A is a series of vertical perforations, $a$, which receive a bolt, D, the said bolt traversing an upwardly-curved bar, E, at its mid-length, the said bar forming a rest for the top end of the cut stalks.

Projecting vertically from the beam is a post or standard, F, having horizontal holes, $f$, for the reception of tenons upon the ends of arms G G', which taper outward and end in points. These arms project horizontally and in an outward and forward direction at an angle of about forty-five degrees with the direction of the beam, and are sufficiently long to engage the uncut corn-stalks in the rows upon each side, and draw the tops of the stalks inward, at the same time pressing them forward, so that when they are cut off near the ground, the tops of the stalks fall upon the rest E.

The rest-bar E and the arms G G' may be adjustable toward or from the foot of the post F, to suit the height of the corn.

The arms G G' may be also adjustable angularly to the direction of the beam, by changing them from one pair of holes $f$ to another, or otherwise.

Connected by hinges H H' to the beam, are bars I I', to whose outer ends are attached the ends of knives J J', which are made preferably of downwardly-curved form, as shown clearly in fig. 1.

The unattached ends of the knives J J' end in pins $j$, and said pins, when the knives are in cutting-position, rest in holes $k$ in a pendent bar K, projecting rigidly from the lower side of the beam A. This pendant is for the purpose of holding the inner ends of the knives firmly in place when in cutting-position.

The knives J J' have a cutting-edge, $j'$, that extends from the outer end which is attached to the bar I or I' as far toward the inner end as may be found necessary, the outer ends acting to sever the stalks and the inner ends to support the buts of the stalks.

Attached to the outer ends of the bars I I', are the ends of a cord or chain, L, and the said cord passes around two pulleys N N', to a lever, O, fulcrumed on a post or standard, P, which is secured to the beam.

Handles Q extend behind the axle.

The wheels C may be placed at such relative distance as to travel either inside or outside of the rows of corn being cut.

Operation.

The machine, with the knives in the position shown in fig. 1, is driven across the field in the direction of the rows, the beam A occupying a position midway between two rows.

The arms G G' first come in contact with the corn on each side, and incline the tops forward and inward, so as to render their severance by the knives easy, and to cause the top ends of the severed stalks to fall upon the rest E, the but ends of the stalks as cut off passing over the tops of the knives and sliding downward and inward thereupon, and against the pendant K.

The stalks are allowed to accumulate until there is sufficient quantity to form an arm-load.

When this has taken place, the stalks are discharged or dumped by the following means:

The rear end of the lever O is depressed by the operator, which action draws up the cord, and, with it, the bars I I', thus disconnecting the knives with the pendant K, and allowing the but ends of the stalks to fall upon the ground, the top ends being drawn from the rest E as the machine progresses.

As soon as the load is discharged, the lever is released and the bars I I' drop into horizontal position, the free ends of the knives becoming again connected with the pendant.

It is not found necessary to stop the horse at the time of discharging a load, as the movements take place with sufficient quickness to allow the discharge to take place in passing from hill to hill.

Claim.

I claim, as my invention—

1. The provision, in a corn-harvester, of the knives J J' j, and hinged bars I I', arranged and operated substantially as described.

2. In combination with the knives J J' and hinged bars I I', the gathering-arms G G' and the rest-bar E, substantially as described.

In testimony of which invention, I hereunto set my hand.

JOHN F. BYLAND.

Witnesses:
 GEO. H. KNIGHT,
 SAML. KNIGHT.